(12) United States Patent
Hikino (10) Patent No.: US 9,143,179 B2
(45) Date of Patent: Sep. 22, 2015

(54) WIRELESS COMMUNICATION DEVICE (75) Inventor: Nozomu Hikino, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 71 days.

(21) Appl. No.: 14/116,447

(22) PCT Filed: Jul. 27, 2012

(86) PCT No.: PCT/JP2012/069254
§ 371 (c)(1),
(2), (4) Date: Nov. 8, 2013

(87) PCT Pub. No.: WO2013/015427
PCT Pub. Date: Jan. 31, 2013

(65) Prior Publication Data
US 2014/0194078 A1    Jul. 10, 2014

(30) Foreign Application Priority Data

Jul. 27, 2011    (JP) ................. 2011-164630

(51) Int. Cl.
*H04M 1/00*    (2006.01)
*H04B 1/3827*    (2015.01)
*G02C 11/00*    (2006.01)
*H01Q 1/27*    (2006.01)
*H01Q 9/16*    (2006.01)

(52) U.S. Cl.
CPC ................ *H04B 1/385* (2013.01); *G02C 11/10* (2013.01); *H01Q 1/273* (2013.01); *H01Q 9/16* (2013.01)

(58) Field of Classification Search
CPC ..... H01Q 1/243; H04B 7/0825; H04B 1/0053
USPC ............... 455/82, 83, 562.1, 575.7, 121, 129, 455/274, 90.2, 556.1; 343/728, 729, 790, 343/845
See application file for complete search history.

(56) References Cited

U.S. PATENT DOCUMENTS

| | | | |
|---|---|---|---|
| 3,383,682 A * | 5/1968 | Stephens, Jr. .................. | 342/24 |
| 8,405,563 B2 * | 3/2013 | McKinzie et al. ............ | 343/746 |
| 2002/0118464 A1 | 8/2002 | Nishioka et al. | |
| 2005/0174296 A1 | 8/2005 | Okado | |
| 2006/0061511 A1* | 3/2006 | Enoki et al. ................... | 343/702 |
| 2011/0186325 A1 | 8/2011 | Myers et al. | |
| 2011/0186345 A1 | 8/2011 | Pakula et al. | |
| 2011/0187245 A1 | 8/2011 | Pakula et al. | |
| 2011/0188178 A1 | 8/2011 | Myers et al. | |
| 2011/0188179 A1 | 8/2011 | Myers et al. | |
| 2011/0188180 A1 | 8/2011 | Pakula et al. | |
| 2011/0221647 A1* | 9/2011 | Freiert ......................... | 343/803 |

FOREIGN PATENT DOCUMENTS

| CN | 1655396 A | 8/2005 |
|---|---|---|
| CN | 102006754 A | 4/2011 |

(Continued)

*Primary Examiner* — Sonny Trinh
(74) *Attorney, Agent, or Firm* — Birch, Stewart, Kolasch & Birch, LLP (57) ABSTRACT

A wireless communication device includes an antenna element for carrying out wireless communications, a power feeding section for supplying power to the antenna element, a conductor other than the antenna element, and a dividing part for dividing the conductor, the dividing part being provided so as to divide the conductor into parts so that each of the parts has a length equal to or less than a quarter of wavelength at an operating frequency at which the antenna element carries out wireless communications.

3 Claims, 10 Drawing Sheets

(56) References Cited

FOREIGN PATENT DOCUMENTS

| JP | 55-008142 A | 1/1980 |
| JP | 56-43945 U | 4/1981 |
| JP | 04-211524 A | 8/1992 |
| JP | 2002-214545 A | 7/2002 |
| JP | 2010-093416 A | 4/2010 |

* cited by examiner

WIRELESS COMMUNICATION DEVICE

TECHNICAL FIELD

The present invention relates to a wireless communication device.

BACKGROUND ART

In recent years, there have been developed electronic devices of eyeglasses appearances, such as (i) a pair of three-dimensional eyeglasses for watching a three-dimensional television and (ii) a pair of three-dimensional eyeglasses and an eyeglasses-type head-mounted display both for enjoying three-dimensional games. These electronic devices may include an antenna to carry out wireless communications.

Conventionally known as an eyeglasses-type wireless communications device is, for example, a device as described in Patent Literature 1, i.e. a device having an antenna provided in or on a frame of a pair of eyeglasses. Specifically, Patent Literature 1 describes a pair of variable-focus eyeglasses having an antenna in or on its frame.

CITATION LIST

Patent Literature

Patent Literature 1

Japanese Patent Application Publication, Tokukai, No. 2002-214545 A (Publication Date: Jul. 31, 2002)

SUMMARY OF INVENTION

Technical Problem

However, in many cases, a frame of a pair of eyeglasses is made of a conductor such as metal. Therefore, in a case where an antenna is provided in or on such a frame, this means that the conductor is positioned near the antenna. When the antenna and the conductor are positioned close to each other, the antenna and the conductor may resonate together and, as a result, antenna characteristics may deteriorate.

The present invention has been made in view of the above problem. A main object of the present invention is to realize a wireless communication device which has excellent antenna characteristics.

Solution to Problem

In order to attain the above object, a wireless communication device in accordance with the present invention includes: an antenna element for carrying out wireless communications; and a power feeding section for supplying power to the antenna element, said wireless communication device further includes: a conductor other than the antenna element; and a dividing part for dividing the conductor, the dividing part being an insulator, the dividing part being provided so as to divide the conductor into parts so that each of the parts has a length equal to or less than a quarter of wavelength at an operating frequency at which the antenna element carries out wireless communications.

In the case where (i) the conductor is divided into parts so that each of the parts is equal to or shorter than a quarter of the wavelength at the operating frequency at which the antenna element carries out communications and (ii) both ends of the each of the parts are open ends, the each of the parts can resonate at a frequency equal to or higher than twice the operating frequency. Accordingly, each of the parts does not resonate with the antenna, element at the operating frequency.

As described above, when the dividing part is provided so as to divide the conductor into parts so that each of the parts is equal to or shorter than a quarter of the wavelength at the operating frequency at which the antenna element carries out communications, the antenna element and the each of the parts do not resonate together. Therefore, antenna characteristics improve.

Advantageous Effects of Invention

A wireless communication device in accordance with the present invention includes: an antenna element for carrying out wireless communications; and a power feeding section for supplying power to the antenna element, said wireless communication device further includes: a conductor other than the antenna element; and a dividing part for dividing the conductor, the dividing part being an insulator, the dividing part being provided so as to divide the conductor into parts so that each of the parts has a length equal to or less than a quarter of wavelength at an operating frequency at which the antenna element carries out wireless communications.

As described above, when the dividing part is provided so as to divide the conductor into parts so that each of the parts is equal to or shorter than a quarter of the wavelength at the operating frequency which the antenna element carries out communications, the antenna element and the each of the parts do not resonate together. Therefore, antenna characteristics improve.

BRIEF DESCRIPTION OF DRAWINGS

(a) of FIG. 3 is a diagram showing one example of electric current amplitude when an antenna element whose physical length is L is resonant, (b) of FIG. 3 is a diagram showing one example of electric current amplitude when a conductor whose length is 2L is resonant, and (c) of FIG. 3 is a diagram showing one example of electric current amplitude when a conductor whose length is L is resonant.

(a) to (c) of FIG. 4 illustrate other examples of the inner structure of the eyeglass-type wireless communication device in accordance with Embodiment 1.

(a) of FIG. 5 is a diagram showing one example of electric current amplitude when an antenna element whose physical length is L is resonant, (b) of FIG. 5 is a diagram showing another example of electric current amplitude when a conductor whose length is 2L is resonant, and (c) of FIG. 5 is a diagram showing another example of electric current amplitude when a conductor whose length is L is resonant.

(a) to (d) of FIG. 6 illustrate examples of an inner structure of a wireless communication device in accordance with Embodiment 2.

(a) of FIG. 10 illustrates one example of a conductor having an end A and an end B, and (b) of FIG. 10 is a table showing a relationship between (i) states of the ends A and B illustrated in (a) of FIG. 10 and (ii) wavelengths at resonance frequencies.

DESCRIPTION OF EMBODIMENTS

The following description will discuss embodiments of the present invention in detail.

Embodiment 1

The following description discusses, with reference to FIGS. 1 to 4, one embodiment (Embodiment 1) of the present invention. Note that a wireless communication device in accordance with the present embodiment is not particularly limited, provided that the wireless communication device has an eyeglasses appearance and carries out wireless communications. The wireless communication device can be applied to various uses such as a pair of three-dimensional eyeglasses, a head-mounted display, a headset, a radio receiver and a personal identification device.

(General Configuration of Wireless Communication Device 1)

Figure 2:
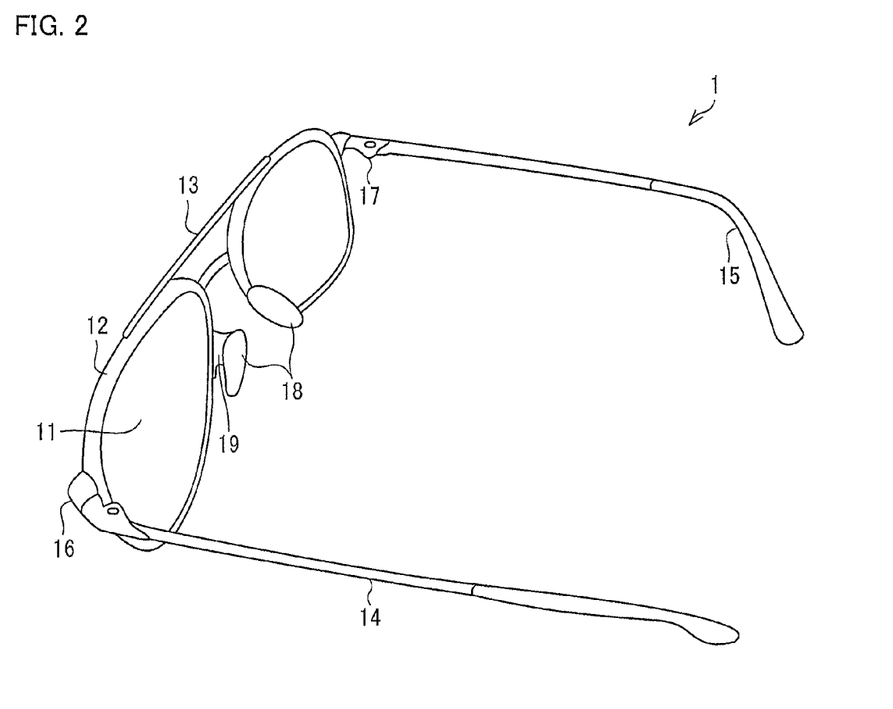
FIG. 2 is a general view of the wireless communication device.

FIG. 2 is a general view of a wireless communication device 1 in accordance with the present embodiment. As illustrated in FIG. 2, the wireless communication device 1 has an eyeglasses appearance and includes eyepiece sections 11, rims 12, a bridge 13, temples 14, temple tips 15, endpieces 16, hinges 17, pads 18, pad arms 19 and the like.

The eyepiece sections 11 are optical members to be positioned respectively in front of right and left eyes. For example, the eyepiece sections 11 can be eyeglasses-type lenses. Alternatively, the eyepiece sections 11 may be each incorporated into a display for displaying images, such as an LCD (liquid crystal display) or a retina operation display.

The rims 12 are retaining members that surround the eyepiece sections 11 so as to retain the eyepiece sections 11. The bridge 13 is a connecting member for making connection between the right and left eyepiece sections 11.

The bridge 13 connects, via the rims 12, between the right and left eyepiece sections 11 in such a manner that the eyepiece sections 11 are placed in predetermined positions.

Each of the temples 14 is a member including an ear-hook and is also called an earpiece. Each of the temples 14 may be arranged such that a part of it to rest on a user's ear is covered with a coating member, which is termed a temple tip 15.

Each of the endpieces 16 is a connecting member for connecting a corresponding eyepiece section 11 and a corresponding temple 14. Each of the endpieces 16 is provided in a region along an outer edge of the eyepiece section 11. Each of the endpieces 16 may be integrated with a corresponding rim 12 or may be independently connected to the eyepiece section.

Each of the hinges 17 is an open/close member for allowing a corresponding temple 14 to be folded with respect to the eyepiece sections 11 and other members. Each of the hinges 17 is provided between a corresponding endpiece 16 and a corresponding temple 14.

Each of the pads 18 is a member to contact a user's nose.

Each of the pad arms 19 is a connecting member connecting a corresponding pad 18 to a corresponding eyepiece section 11. The pad arms 19 connect, via the rims 12, the pads 18 to the eyepiece sections 11 in such a manner that the pads and the eyepiece sections 11 are placed in predetermined positions. The wireless communication device 1 does not necessarily have to include the pad arms 19. In such a case, the pads can be directly connected to the eyepiece sections 11 or the rims 12.

The above-described members may be constructed of the same material(s) as those for typical eyeglasses. However, this does not imply any limitation. Examples of a material for the rims 12, the bridge 13, and the temples 14 include, but are not limited to, metals (such as titanium, titanium alloys, aluminum alloys, magnesium alloys, nickel-chromium alloys, and stainless steel).

(Inner Structure of Wireless Communication Device 1)

Figure 1:
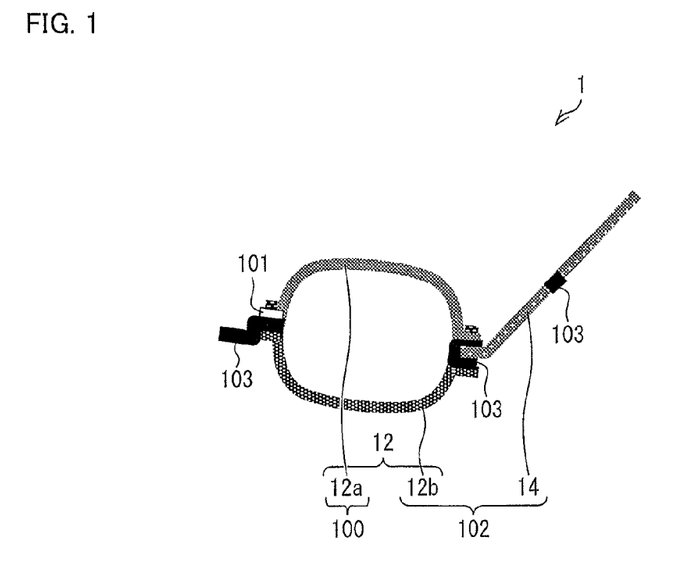
FIG. 1 illustrates one example of an inner structure of a wireless communication device in accordance with Embodiment 1.

The following description discusses an inner structure of the wireless communication device 1 with reference to FIG. 1. FIG. 1 illustrates the inner structure of the wireless communication device 1. As illustrated in FIG. 1, the wireless communication device 1 includes an antenna element 100, a power feeding section 101, a conductor 102, and a plurality of dividing parts 103.

The antenna element 100 is provided in or on an upper rim 12a, which is part of a rim 12. A lower rim 12b, which is also part of the rim 12, and a temple 14 constitute a conductor other than the antenna element 100 (i.e., the conductor 102).

The power feeding section 101 is configured to supply power to the antenna element 100. As illustrated in FIG. 1, the power feeding section 101 is connected to one end of the antenna element 100.

The dividing parts 103 are insulators which are positioned so as to divide the conductor 102. The dividing parts 103 divide the conductor 102 into parts so that each of the parts of the conductor 102 is close to (i) an open end of the antenna element 100 and/or (ii) the power feeding section 101 (i.e., the conductor 102 positioned so that an induced current is to be generated therein by an electric current excited in the antenna element 100).

Figure 3:
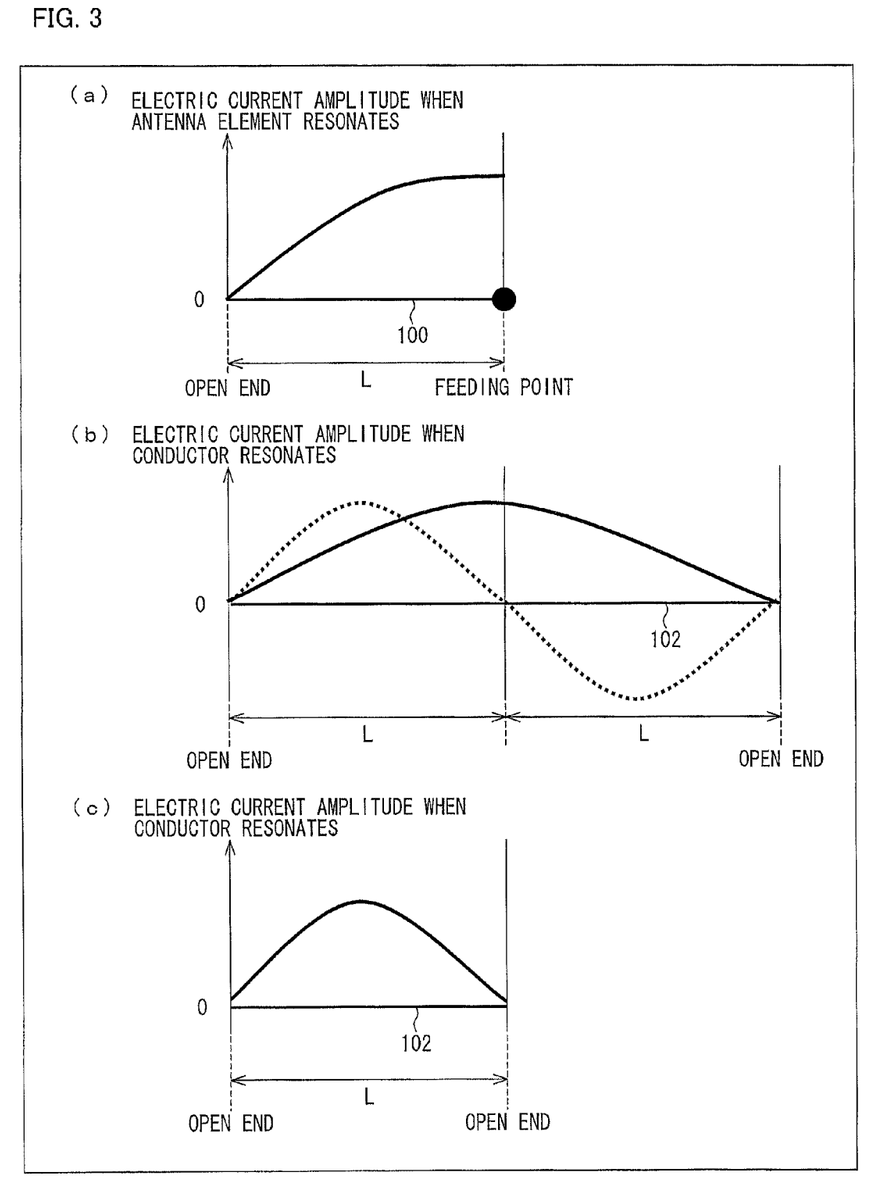

FIG. 3 is a conceptual diagram showing electric current amplitude when the antenna element 100 resonates and electric current amplitude when the conductor 102 resonates.

(a) of FIG. 3 is a conceptual diagram showing electric current amplitude when the antenna element 100 whose length is L resonates. One end of the antenna element 100 is connected to the power feeding section 101 (feeding point), and the other end is an open end. As shown in (a) of FIG. 3, the electric current amplitude is maximum at the feeding point and gradually decreases to reach 0 at the open end. Assuming that the wavelength at a frequency at which the antenna element 100 is to carry out communications (such a frequency is hereinafter referred to as an "operating frequency f1") is λ1 the length L (length of the antenna element 100) can be expressed by L=λ1/4. That is, the length of the antenna element 100 is a quarter of the wavelength at the operating frequency f1.

(b) of FIG. 3 is a conceptual diagram showing electric current amplitude when the conductor 102 whose length is 2L resonates. Since the conductor 102 is not an antenna element, the conductor 102 is not connected with the power feeding section 101, and it is assumed that both ends thereof are open ends. In a case where the conductor 102 is close to the antenna element 100 and thus is driven, the electric current amplitude at the open ends is 0 and becomes maximum around the middle of the conductor 102 (see solid line in (b) of FIG. 3). Comparison between the electric current amplitude in (a) of FIG. 3 and the electric current amplitude shown with the solid line in (b) of FIG. 3 shows that, in both cases, L=λ·¼. That is, 2L=λ·½, and the conductor 102 whose length is 2L resonates at the frequency f1.

Meanwhile, the conductor 102 resonates as long as electric current amplitude at its open ends is 0. That is, the conductor 102 also resonates at a frequency whose wavelength is equal to 2L (see dashed line in (b) of FIG. 3). The frequency here (referred to as a frequency f2) is exactly twice as high as the frequency f1 shown in (a) of FIG. 3. That is, f2=2×f1. Similarly, the conductor 102 resonates in a case where its length 2L is equal to an integral multiple of ½ wavelength (e.g., ½, 1, 3/2, 2, 5/2, 3 . . . ), for example, in a case where the length 2L is 3/2 wavelength long, 2 wavelength long, 5/2 wavelength long and so on. The lowest frequency at which the conductor 102 can resonate is a frequency at which 2L is ½ wavelength long.

(c) of FIG. 3 is a conceptual diagram showing electric current amplitude when the length of the conductor 102 of (b) of FIG. 3 is reduced to L, which is a half of L2. Assuming that both ends of the conductor 102 are open ends, the conductor 102 resonates at a frequency at which a half wavelength is equal to the length L, as with the case shown with the dashed line in (b) of FIG. 3. The frequency here is f2, which is the same as the frequency shown with the dashed line in (b) of FIG. 3. f2 is twice as high as the frequency f1 at which the antenna element 100 operates. The lowest frequency at which the conductor 102 whose length is L can resonate is f2.

That is, the conductor 102, which is equal to or shorter than a quarter of the wavelength at the operating frequency f1 of the antenna element 100, can only resonate at a frequency equal to or higher than twice the frequency f1. Accordingly, the conductor 102 does not cause resonance that interferes with operation of the antenna element 100 at f1, even in the case where the conductor 102 is positioned close to the antenna element 100. Therefore, it is possible to suppress deterioration in characteristics of the antenna element 100.

As described above, in order to prevent unwanted resonance, the dividing parts 103 are positioned so as to electrically divide the conductor 102 into parts so that each of the parts is equal to or shorter than a quarter of the wavelength at the operating frequency at which the antenna element 100 is to carry out communications. As illustrated in FIG. 1, the dividing parts 103 are provided in the rim 12 and the temple 14.

Furthermore, as illustrated in FIG. 1, the rim 12b is close to the power feeding section 101. Furthermore, the temple 14 is close to the open end of the antenna element 100. The parts divided by the dividing parts 103 are such a rim 12b and a temple 14.

The conductor 102, which is close to the open end of the antenna element 100 and/or the power feeding section 101, may resonate with the antenna element 100. In this regard, since the conductor 102 which is close to (i) the open end of the antenna element 100 and/or (ii) the power feeding section 101 is divided, it is possible to prevent the antenna element 100 and the conductor 102 from resonating together at the operating frequency.

(Modified Example)

Note that, although the antenna element 100 is provided in or on the upper rim 12a of the rim 12 and the power feeding section 101 is positioned so as to be connected to the bridge 13 side end of the antenna element 100 in FIG. 1, where to provide the antenna element 100 and the power feeding section 101 is not limited to this.

Figure 4:
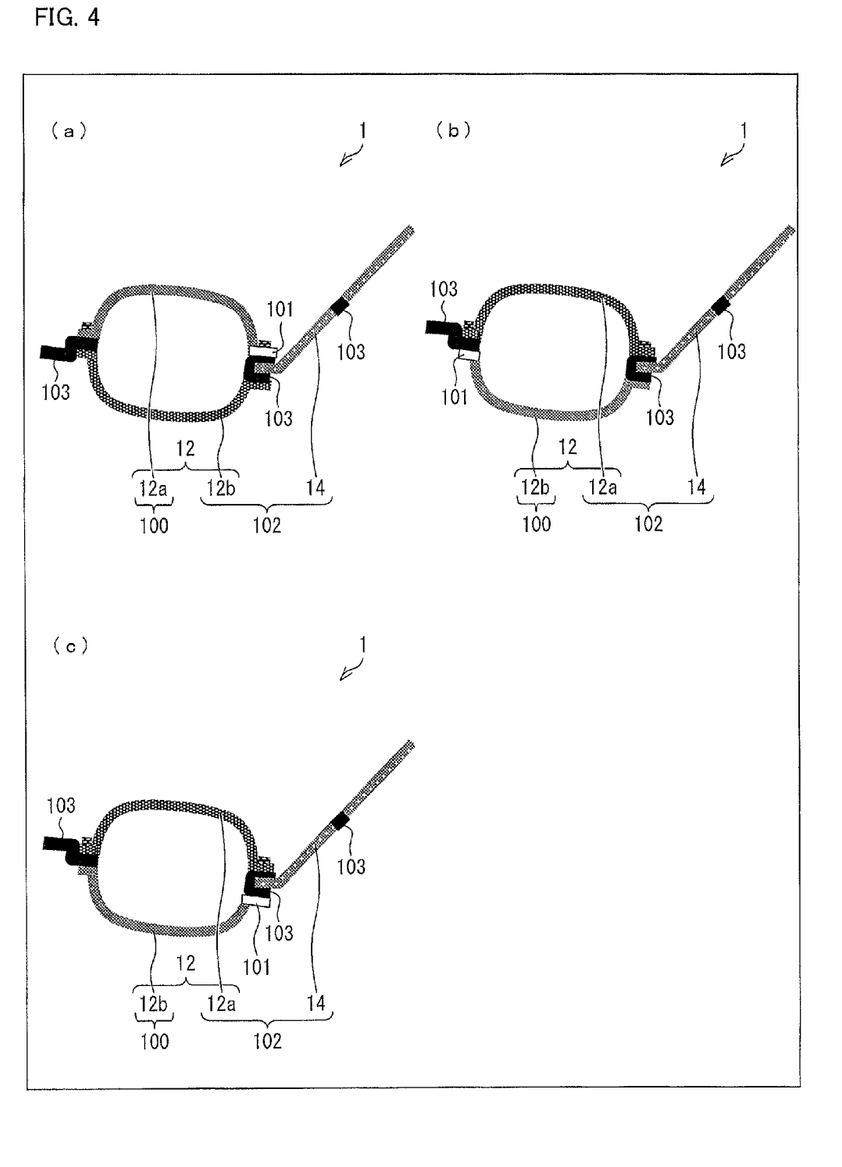

FIG. 4 illustrates other examples of the inner structure of the wireless communication device 1. As illustrated in (a) of FIG. 4, the wireless communication device 1 may be arranged such that the antenna element 100 is provided in or on the upper rim 12a of the rim 12 and the power feeding section 101 is positioned so as to be connected to the endpiece 16 side end of the antenna element 100. Alternatively, as illustrated in (b) of FIG. 4, the wireless communication device 1 may be arranged such that the antenna element 100 is provided in or on the lower rim 12b of the rim 12 and the power feeding section 101 is positioned so as to be connected to the bridge 13 side end of the antenna element 100. Alternatively, as illustrated in (c) of FIG. 4, the wireless communication device 1 may be arranged such that the antenna element 100 is provided in or on the lower rim 12b of the rim 12 and the power feeding section 101 is positioned so as to be connected to the endpiece 16 side end of the antenna element 100.

Note that, although the present embodiment describes an example in which both ends of the conductor 102 are open ends, the both ends of the conductor 102 may be short-circuited ends.

Figure 5:
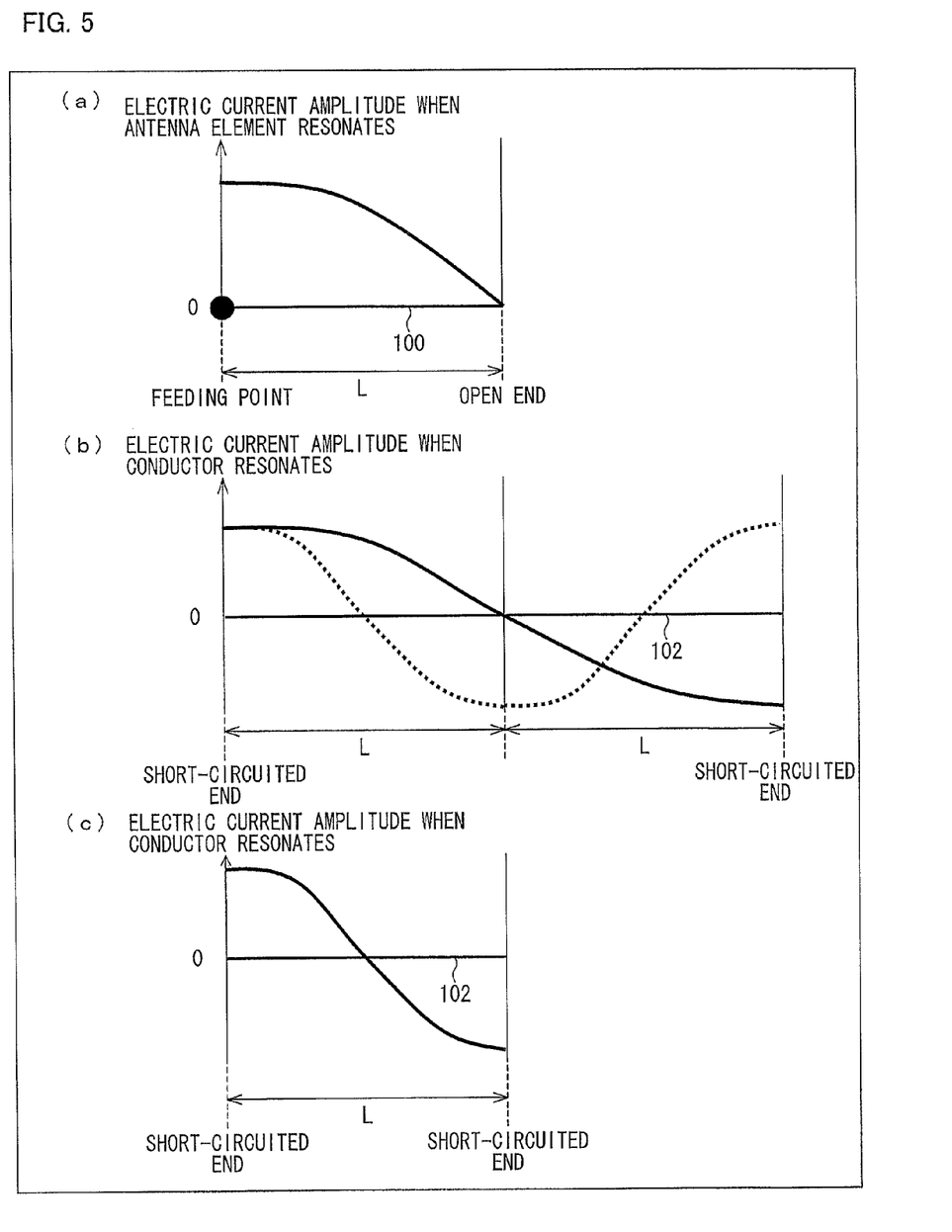

FIG. 5 is a conceptual diagram showing electric current amplitude when the antenna element 100 resonates and electric current amplitude when the conductor 102 resonates.

Since (a) of FIG. 5 is similar to (a) of FIG. 3, a description thereof is omitted here. (b) and (c) of FIG. 5 are conceptual diagrams each showing electric current amplitude obtained in a case where both ends of the conductor 102 are short-circuited. (b) and (c) of FIG. 5 are different from (b) and (c) of FIG. 3, which show the electric current amplitude obtained in the case of open ends, in that the electric current amplitude is maximum at the short-circuited ends and becomes 0 around the middle of the conductor 102. Note, however, that a relationship between (i) the length L of the conductor 102 and (ii) frequencies at which the conductor 102 resonates is the same as that shown in (b) and (c) of FIG. 3. Therefore, descriptions of (b) and (c) of FIG. 5 are omitted here.

That is, also in the case where both ends of the conductor 102 are short-circuited ends, the conductor 102 which is equal to or shorter than a quarter of the wavelength at the operating frequency f1 of the antenna element 100 can only resonate at a frequency equal to or higher than twice the frequency f1. Accordingly, the conductor 102 does not cause resonance that interferes with operation of the antenna element 100 at f1, even in the case where the conductor 102 is positioned close to the antenna element 100. Therefore, it is possible to suppress deterioration in characteristics of the antenna element 100.

The present embodiment describes an example in which the antenna element 100 is provided in or on the upper rim 12a or the lower rim 12b of a rim surrounding an eyepiece section 11 that is to be positioned in front of a left eye (hereinafter, such a rim is simply referred to as a left rim). Note, however, that where to provide the antenna element 100 is not limited to this. The antenna element 100 may be provided in or on an upper rim and/or a lower rim of a rim surrounding an eyepiece section that is to be positioned in front of a right eye (such a rim is referred to as a right rim).

Embodiment 2

Embodiment 1 describes an example in which the antenna element 100 of the wireless communication device 1 having an eyeglasses appearance is provided in or on the rim 12. Note, however, that where to provide the antenna element 100 is not limited to this. The antenna element 100 may be provided, for example, in or on the temple 14.

Figure 6:
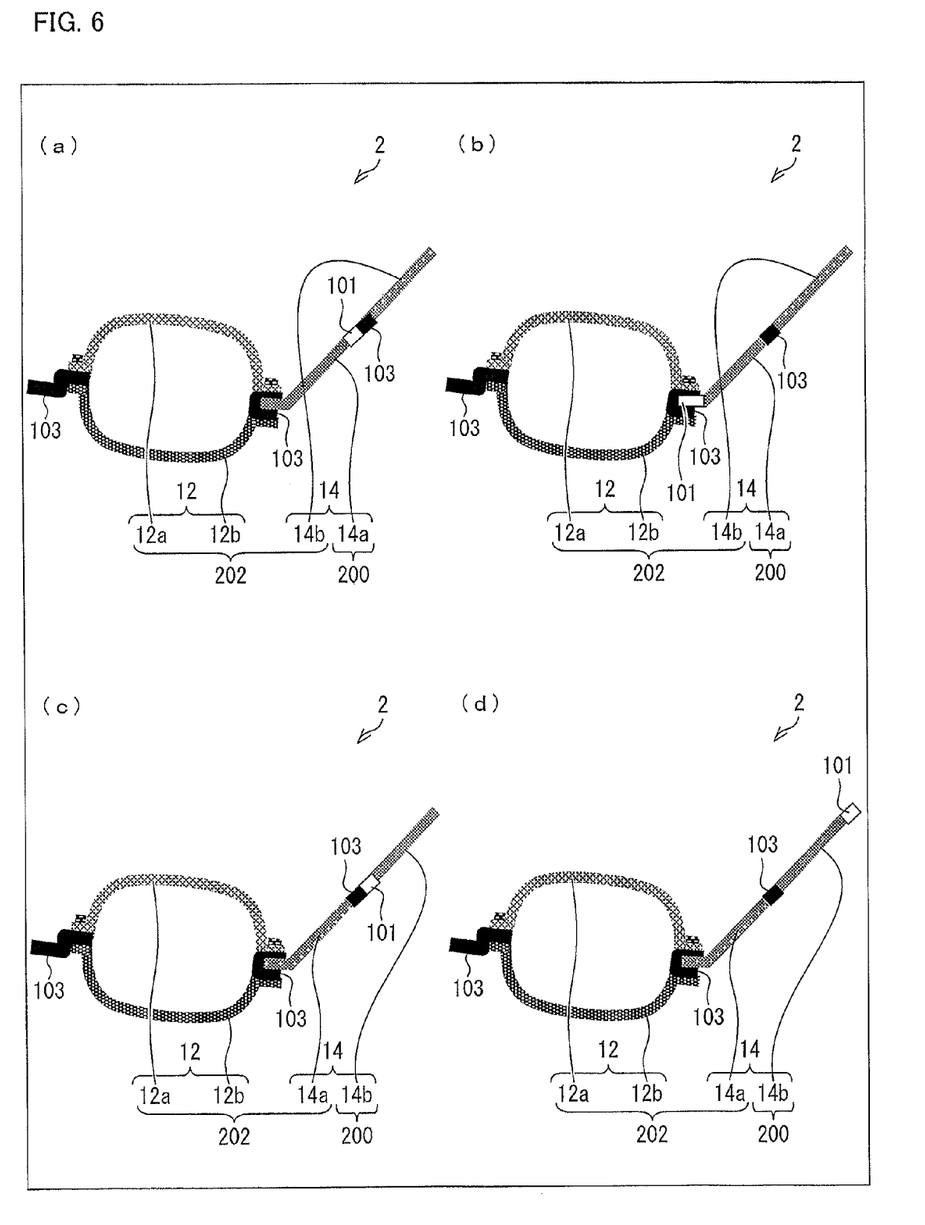
Figure 7:
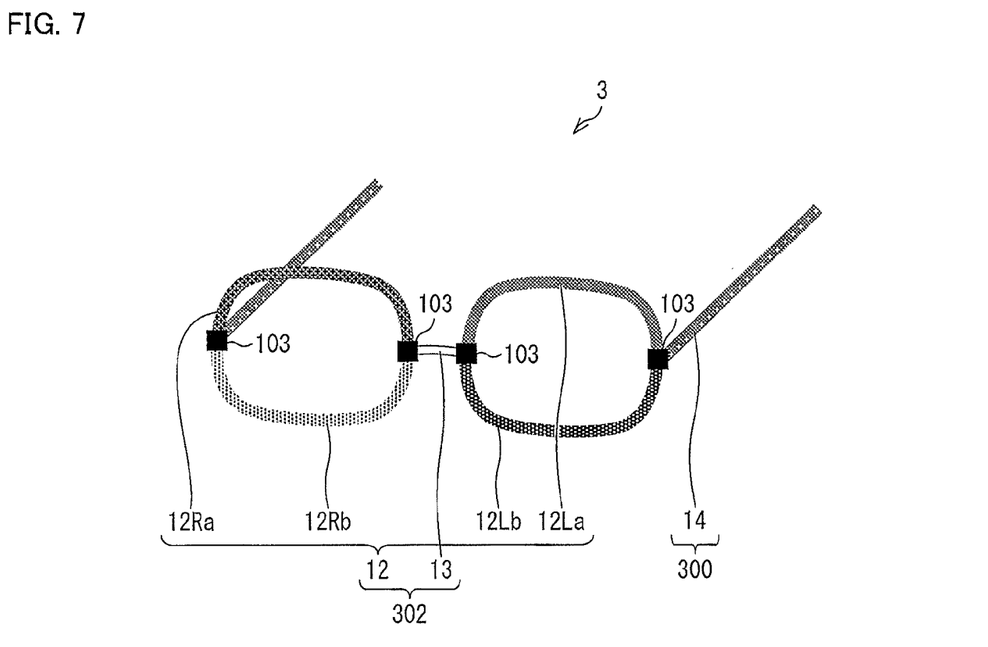
FIG. 7 illustrates another example of the inner structure of the wireless communication device in accordance with Embodiment 2.

The following description discusses another embodiment (Embodiment 2) of the present invention with reference to FIGS. 6 and 7. For convenience of description, members that have functions identical to those illustrated in the drawings of Embodiment are given identical referential numerals, and are not described repeatedly.

(Inner Structure Of Wireless Communication Device 2)

FIG. 6 illustrates an inner structure of a wireless communication device 2 having an eyeglasses appearance. An antenna element 200 of the wireless communication device 2 is provided in or on a temple 14. As illustrated in FIG. 6, the wireless communication device 2 includes a power feeding section 101, dividing parts 103, the antenna element 200 and a conductor 202.

(a) of FIG. 6 illustrates the wireless communication device 2 in which the antenna element 200 is provided in or on an endpiece 16 side portion (i.e., a temple 14*a*) of the temple 14. Furthermore, (i) a temple tip 15 side portion (i.e., temple 14*b*) of the temple 14 and (ii) a rim 12 constitute a conductor other than the antenna element 200 (i.e., the conductor 202). The power feeding section 101 is connected to the temple 14*b* side end of the antenna element 200.

Note that positions of the antenna element 200 and the power feeding section 101 in the wireless communication device 2 are not limited to the above. As illustrated in (b) of FIG. 6, the wireless communication device 2 may be arranged such that (i) the antenna element 200 is provided in or on the temple 14*a* which is the endpiece 16 side portion of the temple 14 and (ii) the power feeding section 101 is positioned so as to be connected to the endpiece 16 side end of the antenna element 200. Alternatively, as illustrated in (c) of FIG. 6, the wireless communication device 1 may be arranged such that (i) the antenna element 100 is provided in or on the temple 14*b* which is the temple tip 15 side portion of the temple 14 and (ii) the power feeding section 101 is positioned so as to be connected to the endpiece 16 side end of the antenna element 100. Alternatively, as illustrated in (d) of FIG. 6, the wireless communication device 1 may be arranged such that (i) the antenna element 100 is provided in or on the temple 14*b* which is the temple tip 15 side portion of the temple 14 and (ii) the power feeding section 101 is positioned so as to be connected to the temple tip 15 side end of the antenna element 200.

(Modified Example)

Alternatively, the antenna element 200 may be provided in or on the entire temple 14, instead of being provided only in or on part of the temple 14.

(Inner Structure of Wireless Communication Device 3)

FIG. 7 illustrates an inner structure of a wireless communication device 3 having an eyeglasses appearance, in which an antenna element 200 is provided in or on the entire temple 14. As illustrated in FIG. 7, the wireless communication device 3 includes a power feeding section 101, dividing parts 103, the antenna element 300 and a conductor 302.

In the case where the antenna element 200 is provided in or on the entire temple 14, a single upper rim (a right upper rim 12R*a* or a left upper rim 12L*a*) or a single lower rim (a right lower rim 12R*b* or a left lower rim 12L*b*) alone is probably shorter than the antenna element 200. However, for example, in a case where the right upper rim 12R*a* and the left upper rim 12L*a* are connected together via a bridge 13 to form the conductor 102, the conductor 102 may be longer than the antenna element 200. If the conductor 102 is longer than the antenna element 200, unwanted resonance may occur between the conductor 102 and the antenna element 200. To prevent this, upper right, upper left, lower right and lower left rims 12 are separated by the dividing parts 103 (see FIG. 7).

With this arrangement, each of the upper right, upper left, lower right and lower left rims (12R*a*, 12L*a*, 12R*b* and 12L*b*) is an independent conductor shorter than the antenna element 200. Accordingly, no unwanted resonance occurs between (i) each of the upper right, upper left, lower right and lower left rims and (ii) the antenna element 200.

Therefore, it is possible to prevent deterioration in antenna characteristics at an operating frequency.

Embodiment 3

Although Embodiments 1 and 2 describe an example in which both ends of the conductor are open ends or short-circuited ends, the conductor is not limited to this arrangement. The conductor can may be arranged such that its one end is a short-circuited end and the other end is an open end.

Figure 8:
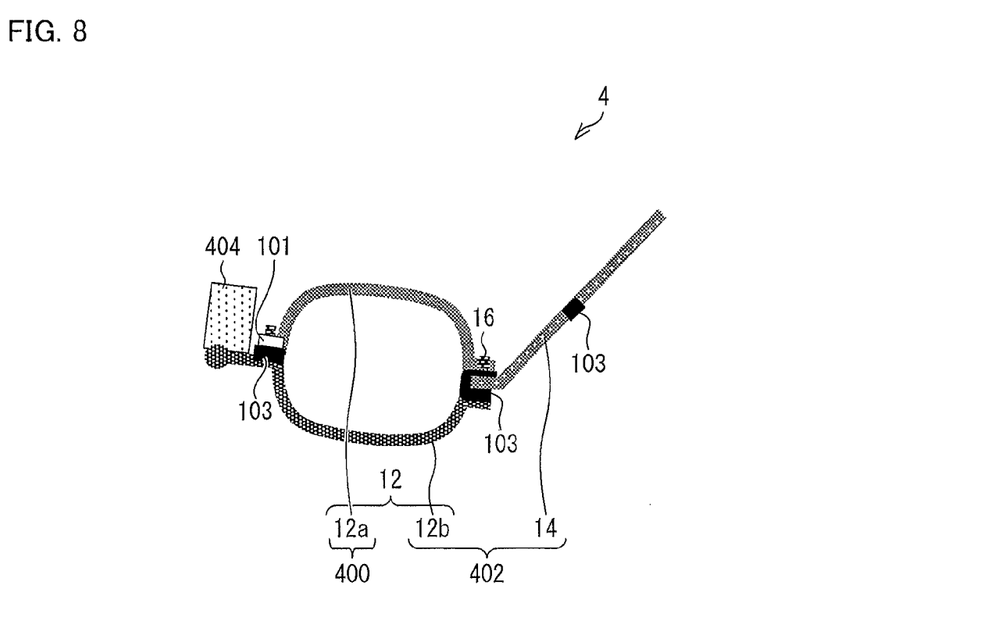
FIG. 8 illustrates one example of an inner structure of a wireless communication device in accordance with Embodiment 3.
Figure 9:
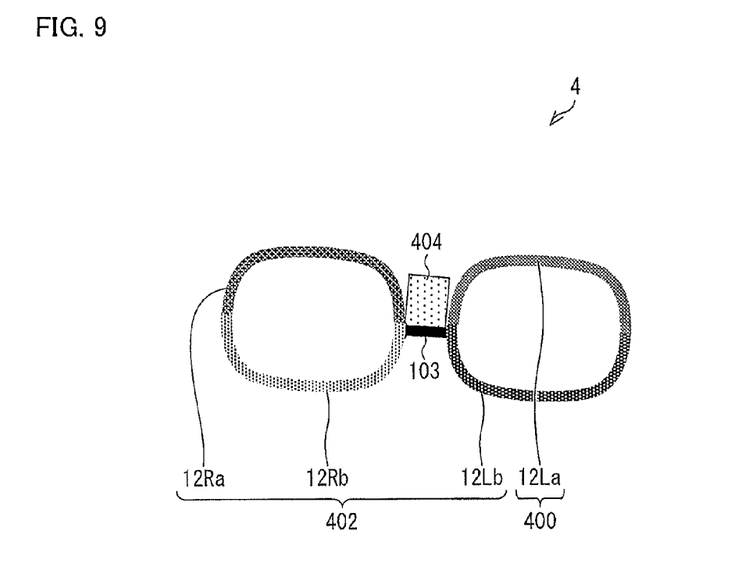
FIG. 9 illustrates another example of the inner structure of the wireless communication device in accordance with Embodiment 3.
Figure 10:
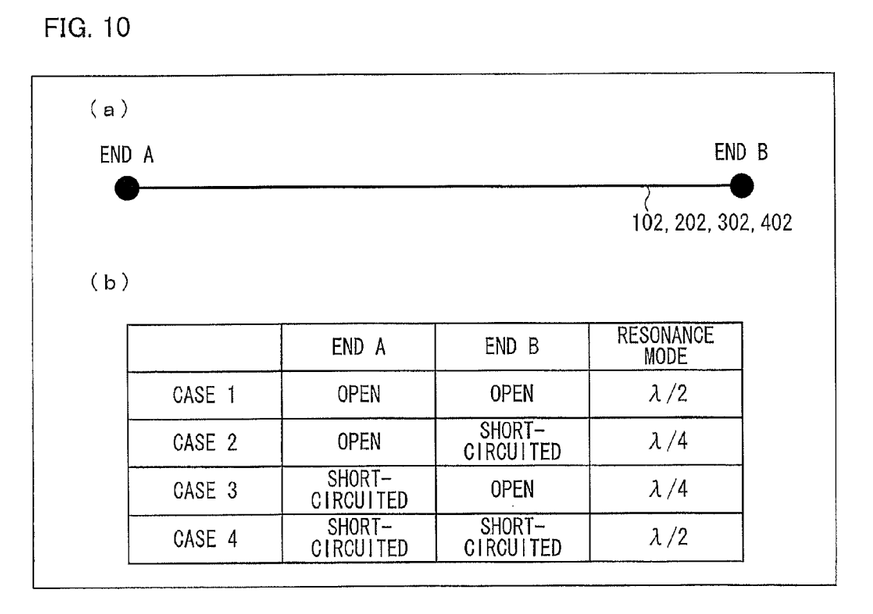

The following description discusses a further embodiment (Embodiment 3) of the present invention with reference to FIGS. 8 to 10. For convenience of description, members that have functions identical to those illustrated in the drawings of Embodiment 1 are given identical referential numerals, and are not described repeatedly.

(Inner Structure of Wireless Communication Device 4)

FIG. 8 illustrates an inner structure of a wireless communication device 4, which is arranged such that one end of a conductor 402 is short-circuited with a circuit GND (ground) 404. As illustrated in FIG. 8, the wireless communication device 4 includes a power feeding section 101, dividing parts 103, an antenna element 400, the conductor 402 and the circuit GND 404.

As illustrated in FIG. 8, the antenna element 400 of the wireless communication device 4 is provided in or on an upper rim 12*a*, which is part of a rim 12. Furthermore, (i) a lower rim 12*b*, which is also part of the rim 12 and (ii) a temple 14 constitute a conductor other than the antenna element 400 (i.e., the conductor 402). The power feeding section 101 is provided on the rim 12*a* so as to be closer to a bridge 13 than to an endpiece 16. Furthermore, the power feeding section 101 is connected to the bridge 13 side end of the antenna element 200. Note that where to provide the power feeding section 101 is not limited to this, and the power feeding section 101 may be provided on the bridge 13.

The rim 12*b*, which is one of parts into which the conductor 402 is divided by a dividing part 103, has (i) the bridge 13 side end which is short-circuited with the circuit GND 404 and (ii) the other end (the endpiece 16 side end) which is an open end. As illustrated in FIG. 8, the rim 12*b* is positioned close to the antenna element 400.

Furthermore, the antenna element 400 and the conductor 402 are positioned so that the angle between the antenna element 400 and the conductor 402 is 90 degrees or larger.

The bridge 13 side end of the rim 12*b* is a short-circuited end, whereas the endpiece 16 side end of the rim 12*b* is an open end. In the case of such a rim 12*b*, electric current amplitude is maximum at the short-circuited end and is 0 at the open end, as described with reference to FIGS. 3 and 5.

Note, here, that the rim 12a (antenna element 400) and the rim 12b (i) have substantially the same length and (ii) are both configured to resonate only when its length is equal to a quarter of the wavelength λ at the operating frequency f at which the antenna element 400 carries out communications. That is, the rim 12b has a length that is equal to a quarter of the wavelength at the operating frequency f. The antenna element 400 and the rim 12b provided close to the antenna element 400, which are arranged so that the angle between the antenna element 400 and the rim 12b is 90 degrees or larger like above, operate as a half-wavelength dipole antenna. This makes it possible to reduce an effect of the circuit GND 404. Therefore, it is possible to suitably improve antenna characteristics.

Note that, although the above description describes an example in which the rim 12b has a length equal to a quarter of the wavelength at the operating frequency f, the length of the rim 12b is not limited to this. The length of the rim 12b is not limited, provided that the antenna element 400 and the rim 12b can function as a half-wavelength dipole antenna, for example, provided that the length of the rim 12b is three-sixteenths to a quarter of the wavelength at the operating frequency f.

(Modified Example)

Although FIG. 8 illustrates an example in which the antenna element 400, which is provided in or on the rim 12a, and the rim 12b function as a half-wavelength dipole antenna, the present invention is not limited to this.

FIG. 9 illustrates an overall configuration of the wireless communication device 4 in which the antenna element 400 is provided in or on a left upper rim 12La. The antenna element 400 is provided in or on the left upper rim 12La as illustrated in FIG. 9, and it is assumed that the power feeding section 101 is connected to the bridge 13 side end of the antenna element 400. In this arrangement, in a case where (i) a right upper rim 12Ra is short-circuited with the circuit GND 404 at a point close to the power feeding section 101 and (ii) the angle between the antenna element 400 and the right upper rim 12Ra is 90 degrees or larger, the antenna element 400 and the right upper rim 12Ra function as a half-wavelength dipole antenna.

Similarly, in a case where (i) a right lower rim 12Rb is short-circuited with the circuit GND 404 at a point close to the power feeding section 101 and (ii) the angle between the antenna element 400 and the rim 12Rb is 90 degrees or larger, the antenna element 400 and the right lower rim 12Rb function as a half-wavelength dipole antenna.

Alternatively, assume that (i) the antenna element 400 is provided in or on the left upper rim 12La (ii) and the power feeding section 101 is provided in or on the rim 12La so as to be closer to the endpiece 16 than to the bridge 13. That is, it is assumed that the power feeding section 101 is connected to the endpiece 16 side end of the antenna element 400. In this arrangement, in a case where (i) a left lower rim 12La is short-circuited with the circuit GND 404 at a point close to the power feeding section 101 and (ii) the angle between the antenna element 400 and the rim 12La is 90 degrees or larger, the antenna element 400 and the left lower rim 12La function as a half-wavelength dipole antenna. Similarly, in a case where (i) the temple 14 is short-circuited with the circuit GND 404 at a point close to the power feeding section 101 and (ii) the angle between the antenna element 400 and the temple 14 is 90 degrees or larger, the antenna element 400 and the temple 14 function as a half-wavelength dipole antenna. Note that where to provide the power feeding section 101 is not limited to this, and therefore the power feeding section 101 may be provided in or on the endpiece 16.

Furthermore, although the present embodiment describes an example in which the antenna element 400 is provided in or on the left upper rim 12La, where to provide the antenna element 100 is not limited to this. The antenna element 100 may be provided in or on the left lower rim 12Lb, the right upper rim 12Ra or the right lower rim 12Rb.

FIG. 10 shows a relationship between (i) states of both ends of a conductor and (ii) wavelengths at resonance frequencies. (b) of FIG. 10 is a table showing a relationship between (i) the states of both ends of a conductor 102 (202, 302 or 402) having an end A and an end B as illustrated in (a) of FIG. 10 and (ii) wavelengths at resonance frequencies.

As shown in (b) of FIG. 10, in a case where the end A is an open end and the end B is an open end (CASE 1), wavelength at a frequency at which the conductor resonates (resonance mode) is ½ the wavelength λ at the operating frequency, as described in Embodiment 1. In a case where the end A is a short-circuited end and the end B is a short-circuited end (CASE 4), the resonance mode is λ/2.

On the other hand, in a case where (i) the end A is an open end and the end B is a short-circuited end (CASE 2) or (ii) the end A is a short-circuited end and the end B is an open end (CASE 3), the resonance mode is λ/4 as described in the present embodiment.

As is clear from above, in order for the conductor 402 and the antenna element 400 to be able to function as a half-wavelength dipole antenna, it is only necessary that the one end of the conductor 402 be a short-circuited end and the other end be an open end.

Furthermore, one (e.g., rim 12b) of parts, into which the conductor 402 is divided by the dividing parts 103, is positioned so that an induced current is to be generated therein by an electric current excited in the antenna element 400. One end of such one of the parts is a short-circuited end and the other end is an open end. Furthermore, the short-circuited end of the one of the parts is positioned closer to the power feeding section 101 than the open end is. Furthermore, the antenna element 400 and the one of the parts are arranged so that the angle between the antenna element 400 and the one of the parts is 90 degrees or larger. This allows the antenna element 400 and the one of the parts to function as a half-wavelength dipole antenna. This makes it possible to further improve antenna characteristics.

Embodiment 4

Embodiments 1 to 3 each describe a wireless communication device having an eyeglasses appearance. Note, however, that the wireless communication device of the present invention is not limited to this. For example, the wireless communication device may be a portable terminal device such as a mobile phone terminal. The following description discusses still a further embodiment (Embodiment 4) of the present invention with reference to FIGS. 11 and 12.

(Configuration of Wireless Communication Device 5)

Figure 11:
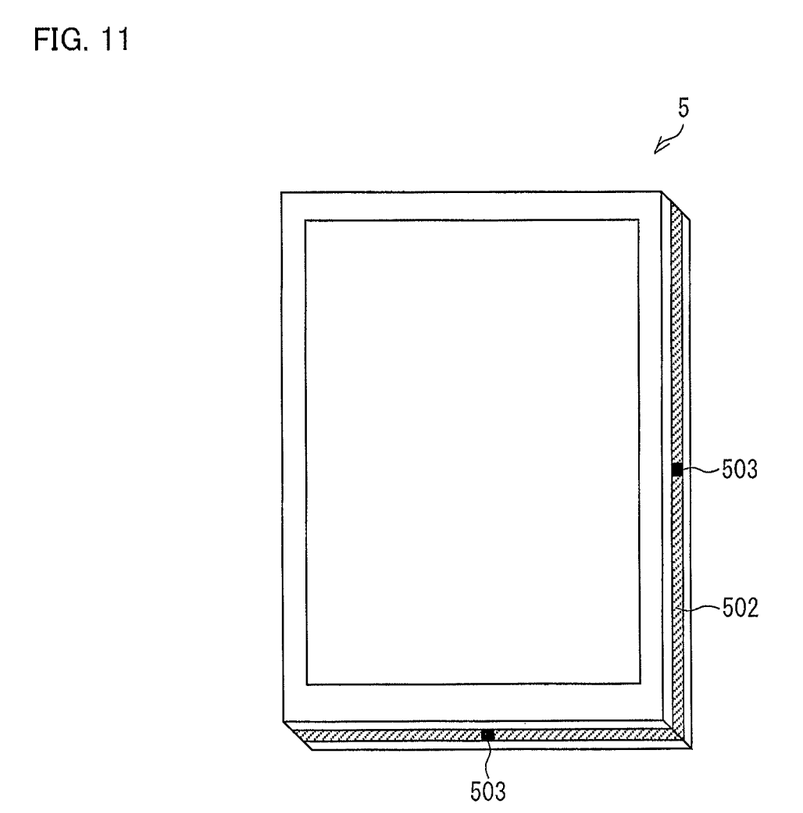
FIG. 11 illustrates one example of a configuration of a wireless communication device in accordance with Embodiment 4.

FIG. 11 illustrates a configuration of a wireless communication device 5 having a mobile phone terminal appearance. As illustrated in FIG. 11, the wireless communication device 5 includes a conductor 502 and dividing parts 503. The conductor 502 is provided along an outer edge of the wireless communication device 5. The conductor 502, which has a belt shape, is a decorative member for decorating the wireless communication device 5, and does not play any role electrically. The conductor 502 can be made of, for example, a metal (such as titanium, a titanium alloy, an aluminum alloy, a magnesium alloy, a nickel-chromium alloy or stainless steel). Note, however, that the material for the conductor 502 is not limited to those listed above. Further note that the shape of the conductor 502 is not limited to the belt shape.

The dividing parts 503 are insulating members which are provided so as to divide the conductor 502. The dividing parts 503 divide the conductor 502 into parts so that each of the parts has a length that is equal to or less than a quarter of the wavelength at an operating frequency. Furthermore, the wireless communication device 5 is configured such that each of the parts into which the conductor 502 is divided is (i) not in connection with a ground of the wireless communication device 5 (i.e., both ends are open ends) or (ii) in electrical connection with the ground (i.e., both ends are short-circuited ends).

As described above, even if the wireless communication device 5 includes the conductor 502 which is provided for decoration purposes, it is possible to prevent deterioration in antenna characteristics by providing the dividing parts 503 so that the conductor 502 is divided into parts and each of the parts has a length equal to or less than a quarter of the wavelength at an operating frequency.

(Modified Example)

Figure 12:
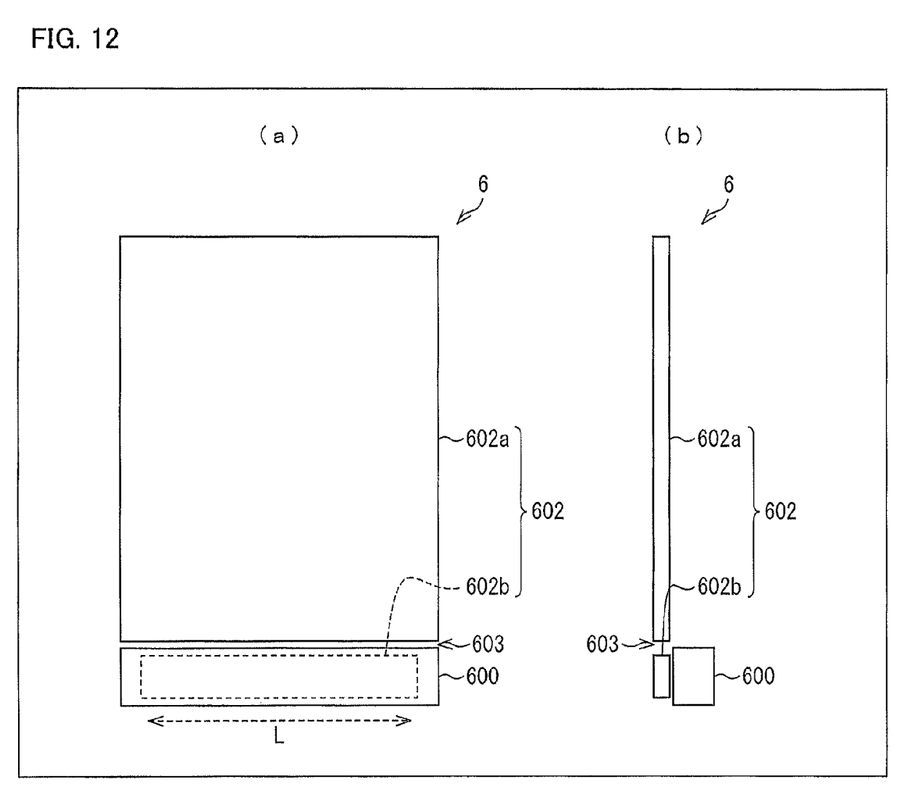
FIG. 12 illustrates another example of the configuration of the wireless communication device in accordance with Embodiment 4. (a) of FIG. 12 is a top view of the wireless communication device, and (b) of FIG. 12 is a side view of the wireless communication device.

The following description discusses another example of the wireless communication device having a mobile phone terminal appearance. FIG. 12 is a view illustrating a configuration of a wireless communication device 6 having a mobile phone terminal appearance.

(Configuration of Wireless Communication Device 6)

(a) of FIG. 12 is a top view of the wireless communication device 6, and (b) of FIG. 12 is a side view of the wireless communication device 6. As illustrated in (a) and (b) of FIG. 12, the wireless communication device 6 includes an antenna element 600, a conductor 602 and a gap (dividing part) 603. The conductor 602 is a member for fixing thereon a main body of the wireless communication device 6, and includes a large sheet metal 602a and a small sheet metal 602b.

The small sheet metal 602b is bonded to the antenna element 600 with, for example, a resin. The small sheet metal 602b has a longitudinal length L (length in a lateral direction of (a) of FIG. 12) equal to or less than a quarter of the wavelength at an operating frequency. In this arrangement, if the large sheet metal 602a and the small sheet metal 602b are brought into contact with each other, the longitudinal length of the large sheet metal 602a and the small sheet metal 602b combined together is equal to the length in a vertical direction of (b) of FIG. 12. That is, the vertical length of the large sheet metal 602a and the small sheet metal 602b may become longer than the length of the antenna element 600. To prevent this, there is the gap 603 so that the large sheet metal 602a and the small sheet metal 602b are not in connection with each other. With this, the large sheet metal 602a is insulated from the small sheet metal 602b.

Embodiment 5

The present embodiment describes a wireless communication device having a watch appearance. The following describes still yet a further embodiment (Embodiment 5) of the present invention with reference to FIG. 13.

(Configuration of Wireless Communication Device 7)

Figure 13:
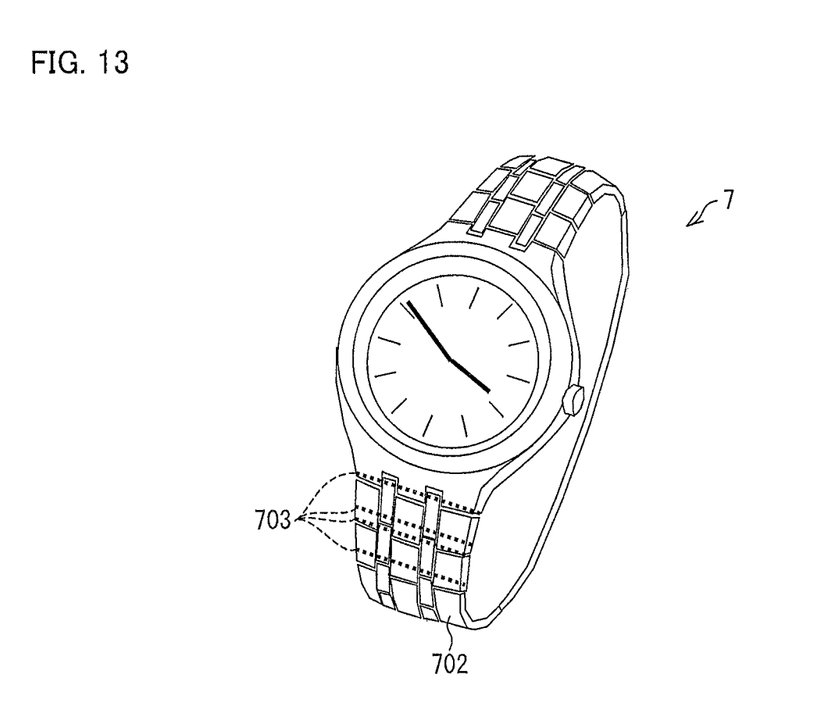
FIG. 13 illustrates one example of a configuration of a wireless communication device in accordance with Embodiment 5.

FIG. 13 illustrates a configuration of a wireless communication device 7 having a watch appearance. As illustrated in FIG. 13, the wireless communication device 7 includes a conductor 702 and connection shafts (dividing parts) 703. It is assumed that the wireless communication device 7 has a wireless communications function such as GPS or Bluetooth (registered trademark).

The conductor 702 is constituted by a plurality of parts connected together by the connection shafts 703, and it is in the shape of a band. The conductor 702 can be made of, for example, a metal (such as titanium, a titanium alloy, an aluminum alloy, a magnesium alloy, a nickel-chromium alloy or stainless steel). Note, however, that the material for the conductor 702 is not limited to those listed above.

The connection shafts 703 are nonconductors (insulators). That is, the connection shafts 703 are provided so that the parts of the conductor 702 are insulated from each other. Note that a quarter of the wavelength at an operating frequency of GPS is approximately 50 mm, and a quarter of the wavelength at an operating frequency of Bluetooth is approximately 30 mm. In view of this, with the use of the connection shafts 703, each of the parts of the conductor 702 is made equal to or shorter than a quarter of the wavelength at the operating frequency. This makes it possible to prevent deterioration in antenna characteristics.

The present invention is not limited to the description of the embodiments above, but may be altered by a skilled person within the scope of the claims. An embodiment based on a proper combination of technical means disclosed in different embodiments is encompassed in the technical scope of the present invention.

[Main Points of Invention]

A wireless communication device in accordance with the present invention includes: an antenna element for carrying out wireless communications; and a power feeding section for supplying power to the antenna element, said wireless communication device further includes: a conductor other than the antenna element; and a dividing part for dividing the conductor, the dividing part being an insulator, the dividing part being provided so as to divide the conductor into parts so that each of the parts has a length equal to or less than a quarter of wavelength at an operating frequency at which the antenna element carries out wireless communications.

In the case where (i) the conductor is divided into parts so that each of the parts is equal to or shorter than a quarter of the wavelength at the operating frequency at which the antenna element carries out communications and (ii) both ends of the each of the parts are open ends, the each of the parts can resonate at a frequency equal to or higher than twice the operating frequency. Accordingly, each of the parts does not resonate with the antenna element at the operating frequency.

As described above, when the dividing part is provided so as to divide the conductor into parts so that each of the parts is equal to or shorter than a quarter of the wavelength at the operating frequency at which the antenna element carries out communications, the antenna element and the each of the parts do not resonate together. Therefore, antenna characteristics improve.

The wireless communication device in accordance with the present invention can be configured such that (i) both ends of each of the parts divided by the dividing part are open ends or (ii) both ends of each of the parts divided by the dividing part are short-circuited ends.

In the case where both ends of each of the parts are open ends, resonance occurs so that electric current amplitude at both ends is 0. In the case where both ends of each of the parts are short-circuited ends, resonance occurs so that the electric current amplitude is maximum at both ends. That is, in either case, each of the parts resonates when it is a half of a wavelength long. Accordingly, in a case where a conductor is equal to or shorter than a quarter of the wavelength at the operating frequency at which the antenna element carries out communications, the conductor resonates at a frequency that is equal to or higher than twice the operating frequency. Therefore, (i)

the antenna element and (ii) each of the parts do not resonate together at the operating frequency. This makes it possible to successfully prevent deterioration in antenna characteristics caused by resonance.

The wireless communication device in accordance with the present invention can be configured such that one of the parts divided by the dividing part (i) has one end and the other end, the one end being a short-circuit end which is short-circuited with a ground, and the other end being an open end, (ii) is positioned so that an induced current is to be generated therein by an electric current excited in the antenna element, and (iii) has a length of three-sixteenths to a quarter of wavelength at the operating frequency; the short-circuited end is closer to the power feeding section than the open end is; and an angle between the one of the parts and the antenna element is 90 degrees or larger.

The length of the antenna element is equal to a quarter of the wavelength at the operating frequency at which the antenna element carries out communications. In this arrangement, one of the parts divided by the dividing part, whose one end is short-circuited with the ground and the other end is an open end, is positioned so that an induced current is to be generated therein by an electric current excited in the antenna element.

Furthermore, the short-circuited end of the one of the parts is positioned closer to the power feeding section than the open end is. Furthermore, the one of the parts is provided so that the angle between the antenna element and the one of the parts is 90 degrees or larger. With this arrangement, an induced current is generated in the one of the parts, and the antenna element and the one of the parts each resonate at a frequency of ¼ wavelength. Such an antenna element and the one of the parts serve as a dipole antenna. Therefore, it is possible to suitably improve antenna characteristics in an operating frequency band.

INDUSTRIAL APPLICABILITY

The present invention is widely applicable to production of wireless communication devices.

REFERENCE SIGNS LIST

1 Wireless communication device
11 Eyepiece section
12 Rim
13 Bridge
14 Temple
15 Temple tip
16 Endpiece
17 Hinge
18 Pad
19 Pad arm
100 Antenna element
101 Power feeding section
102 Conductor
103 Dividing part
2 Wireless communication device
200 Antenna element
202 Conductor
3 Wireless communication device
300 Antenna element
302 Conductor
4 Wireless communication device
400 Antenna element
402 Conductor
404 Circuit GND (ground)
5 Wireless communication device
502 Conductor
503 Dividing part
6 Wireless communication device
600 Antenna element
602 Conductor
603 Gap (dividing part)
7 Wireless communication device
702 Conductor
703 Connection shaft (dividing part)

The invention claimed is:

1. A wireless communication device comprising:
an antenna element for carrying out wireless communications; and
a power feeding section for supplying power to the antenna element,
said wireless communication device further comprising:
a conductor other than the antenna element; and
a dividing part for dividing the conductor, the dividing part being an insulator, the dividing part being provided so as to divide the conductor into parts so that each of the parts has a length equal to or less than a quarter of wavelength at an operating frequency at which the antenna element carries out wireless communications,
wherein both ends of each of the parts divided by the dividing part are open ends.

2. A wireless communication device comprising:
an antenna element for carrying out wireless communications; and
a power feeding section for supplying power to the antenna element,
said wireless communication device further comprising:
a conductor other than the antenna element; and
a dividing part for dividing the conductor, the dividing part being an insulator, the dividing part being provided so as to divide the conductor into parts so that each of the parts has a length equal to or less than a quarter of wavelength at an operating frequency at which the antenna element carries out wireless communications,
wherein both ends of each of the parts divided by the dividing part are short-circuited ends.

3. A wireless communication device comprising:
an antenna element for carrying out wireless communications; and
a power feeding section for supplying power to the antenna element,
said wireless communication device further comprising:
a conductor other than the antenna element; and
a dividing part for dividing the conductor, the dividing part being an insulator, the dividing part being provided so as to divide the conductor into parts so that each of the parts has a length equal to or less than a quarter of wavelength at an operating frequency at which the antenna element carries out wireless communications,
wherein:
one of the parts divided by the dividing part (i) has one end and the other end, the one end being a short-circuit end which is short-circuited with a ground, and the other end being an open end, (ii) is positioned so that an induced current is to be generated therein by an electric current excited in the antenna element, and (iii) has a length of three-sixteenths to a quarter of wavelength at the operating frequency;

the short-circuited end is closer to the power feeding section than the open end is; and
an angle between the one of the parts and the antenna element is 90 degrees or larger.

* * * * *